Figure 1:
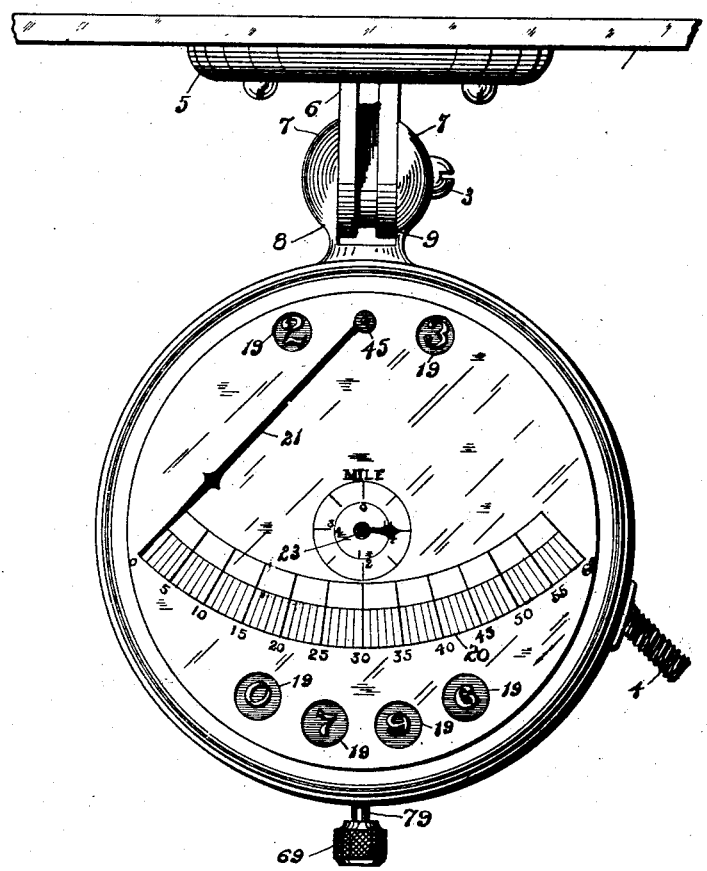

W. W. DUDLEY, L. A. GREENLEAF & W. R. DUDLEY.
SPEED INDICATOR.
APPLICATION FILED SEPT. 1, 1906.

917,267.

Patented Apr. 6, 1909.
4 SHEETS—SHEET 1.

WITNESSES

INVENTORS.
WILLIAM W. DUDLEY.
LOUIS A. GREENLEAF.
WALLACE R. DUDLEY.
BY
Russell M. Everett,
ATTORNEY.

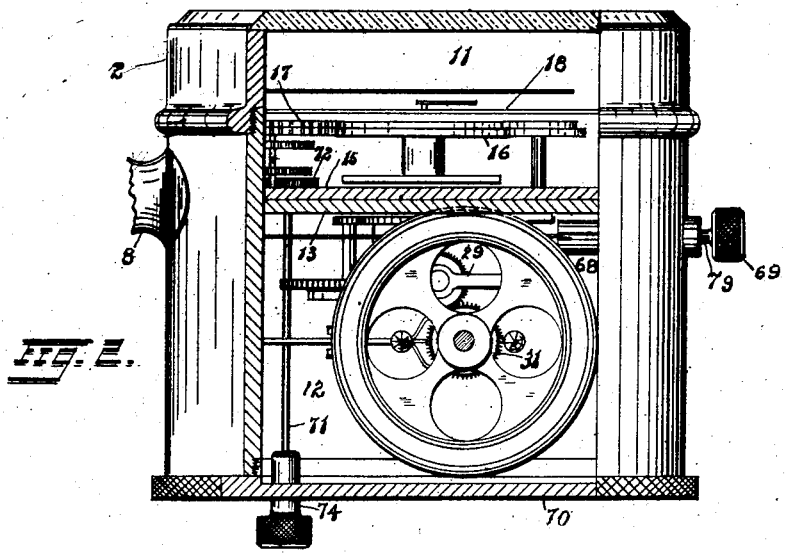
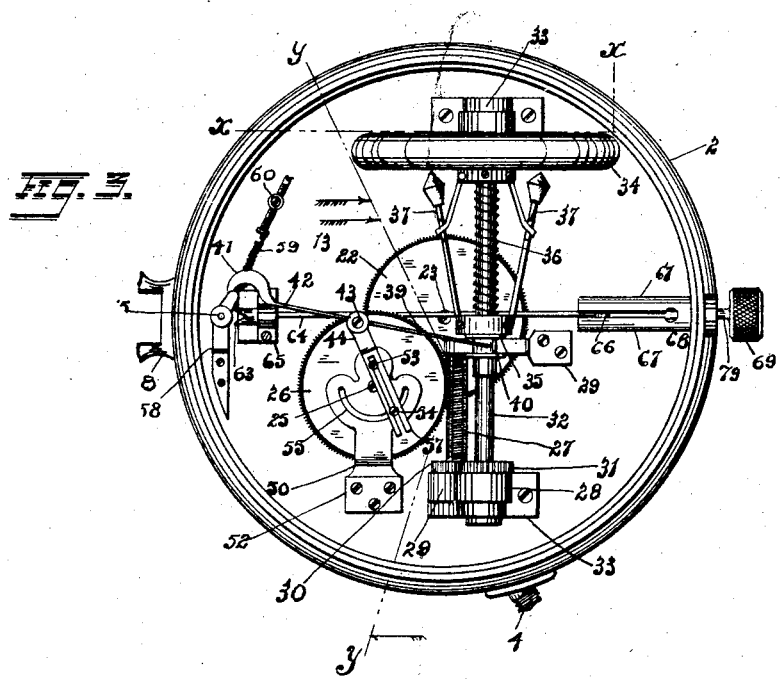

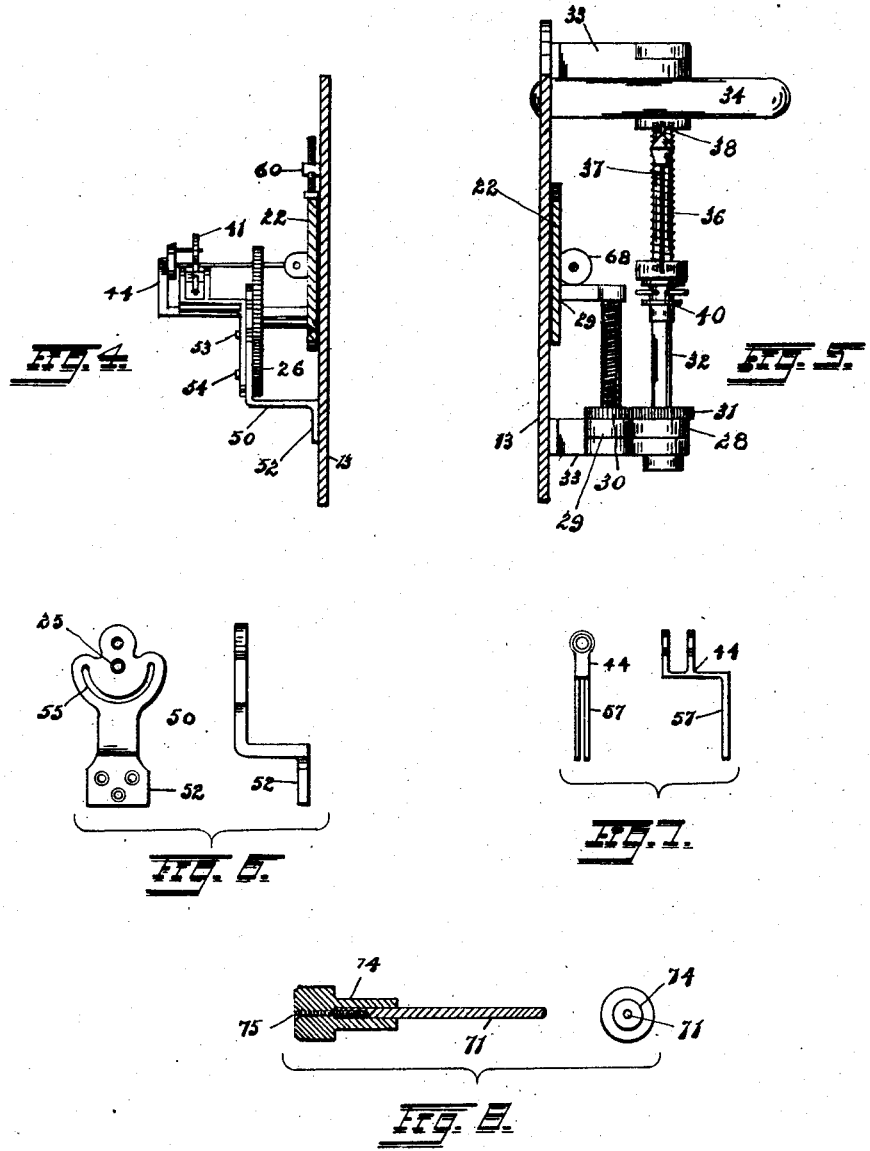

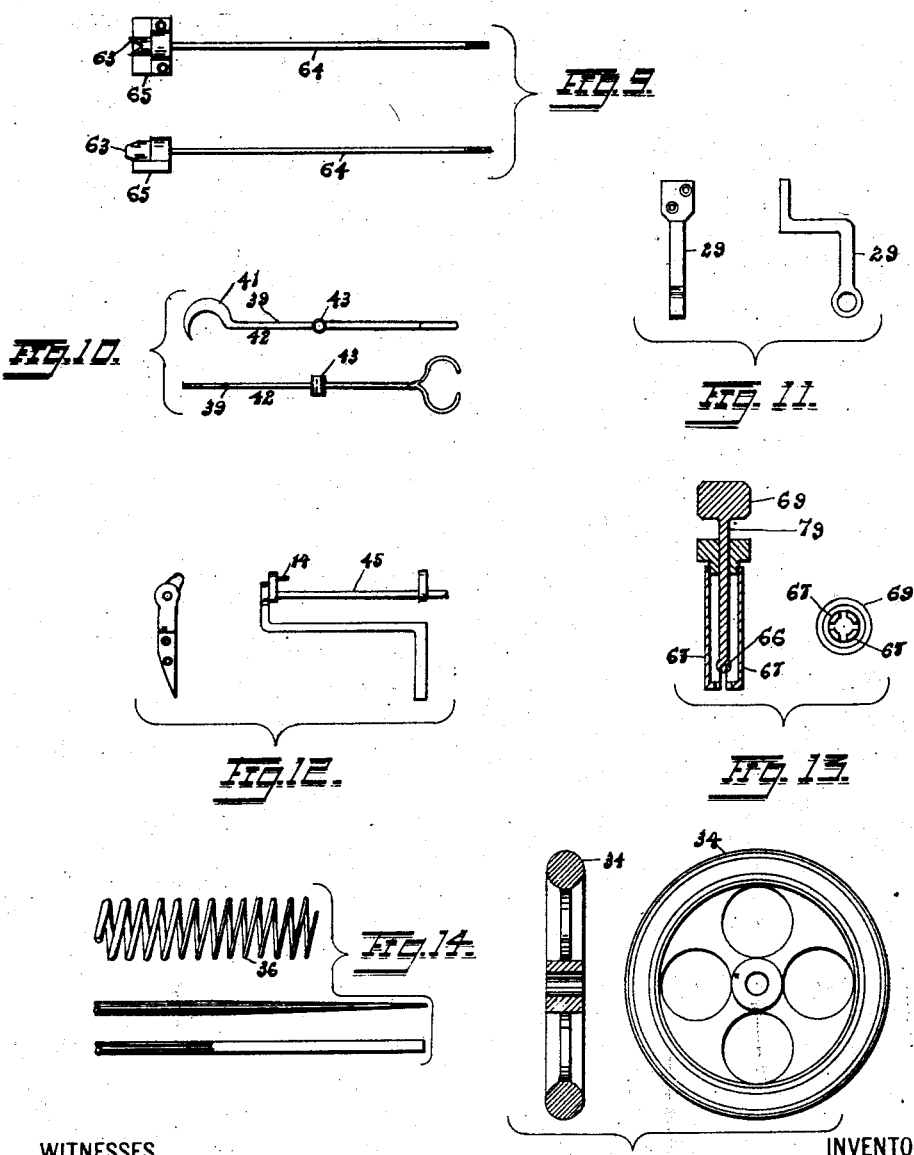

UNITED STATES PATENT OFFICE.

WILLIAM W. DUDLEY, OF LANCASTER, PENNSYLVANIA, AND LOUIS A. GREENLEAF AND WALLACE R. DUDLEY, OF TRENTON, NEW JERSEY, ASSIGNORS TO STAR SPEEDOMETER COMPANY, A CORPORATION OF PENNSYLVANIA.

SPEED-INDICATOR.

No. 917,267.             Specification of Letters Patent.            Patented April 6, 1909.

Application filed September 1, 1906. Serial No. 332,905.

*To all whom it may concern:*

Be it known that we, WILLIAM W. DUDLEY, residing at Lancaster, in the county of Lancaster, State of Pennsylvania, and LOUIS A. GREENLEAF and WALLACE R. DUDLEY, both residing at Trenton, in the county of Mercer and State of New Jersey, all citizens of the United States, have invented certain new and useful Improvements in Speed-Indicators, of which the following is a specification.

The invention relates more particularly to that class of indicators which are employed upon automobiles to show the speed at which the machine is traveling at any given moment, although it will be obvious that the invention is capable of a wider and more extended use if desired.

The objects of the invention are to secure an accurate indication of the speed of the vehicle, particularly at the low speeds; to provide for this purpose a spiral governor spring formed of tapered wire; to further increase accuracy of the indicator by having a governor run at double the speed of the flexible or power-transmitting shaft; to provide a balance wheel mounted directly upon the governor shaft; to mount the different parts of the indicator by means of bridgework whereby they are exposed and the mechanism lightened; to fulcrum upon an adjustable center, the lever which transmits motion from the governor to the speed-indicating hand, so that the same can be accurately adjusted to different conditions; to provide such lever with a cam for engaging the speed indicating lever, whereby the different positions of the parts will be compensated for; to provide a stop for locking the speed-indicating lever in its position at any given moment; to thus preserve the reading of the indicator, if desired; to expose the parts of the mechanism for inspection or adjustment; to facilitate access to the interior of the casing, and to obtain other advantages and results, as may be brought out in the following description.

Referring to the accompanying drawings, in which like numerals of reference indicate corresponding parts in each of the several figures, Figure 1 is a plan of our improved speed indicator arranged in connection with an odometer in a suitable casing and mounted for use; Fig. 2 is a side view partly in section upon line *x—x*, Fig. 3; Fig. 3 is a view from beneath of the speed indicator parts, the cap or cover of the casing being removed; Fig. 4 is a vertical section on line *y—y*, Fig. 3, looking in the direction indicated by the single arrow, and Fig. 5 is a similar sectional view looking in the opposite direction as indicated by the double arrow; Fig. 6 shows in plan and edge view, a certain bridge for supporting upon an adjustable center, the lever for transmitting movement from the governor to the speed indicator; Fig. 7 shows in plan and edge view, a bracket adapted to coöperate with the bridge shown in Fig. 6; Fig. 8 shows in longitudinal section and inner end view certain means for setting the trip-recording portion of our device; Fig. 9 shows in plan and side view a certain stop for securing the speed indicator in its position at a given time; Fig. 10 is a plan and edge view of the lever for transmitting motion from the governor to the speed indicator; Fig. 11 is a plan and side view of a certain bridge for supporting the screw-shaft; Fig. 12 shows in plan and side view, the bridge for mounting and supporting the shaft which carries the registering hand or pointer; Fig. 13 shows in longitudinal section, and inner end view, the preferred means for operating the stop illustrated in Fig. 9; Fig. 14 shows the governor spring and two views of its end portion before being coiled, enlarged to illustrate the tapering thereof, and Fig. 15 is a cross-sectional and plan view of a certain balance wheel for the governor shaft.

In said drawings, 1 indicates any suitable part of an automobile, or other surface, to which a speed indicator is adapted to be secured, and 2 indicates the casing of our improved device which is shown as cylindrical with its axial center line adapted to be brought into vertical position. An attaching plate 5 is provided on the support 1, and having a bifurcated tongue 6 to lie between the arms 7 of a bifurcated stem 8 upon the casing 2, a pivotal pin or screw 3 being passed through all said parts. Preferably, adjustability of the device is secured by means of the screw 3, a washer 9 being arranged thereon between the parts of the tongue 6, but adjustment to different vertical positions may be otherwise secured, as for instance by the toothed arm 10 shown in our prior application, filed June 5, 1906, Serial No. 320,333. The casing 2 is divided transversely into upper and lower chambers 11, 12, respectively, by means of a fixed partition 13, against which the base-plate 15 of the odometer lies,—this casing, its partitions and chambers just described, and the odometer 16, being for all practical purposes the same as shown in our prior application above referred to. Above the disks 17 of the odometer is arranged a dial 18, apertured as at 19 to expose said disks or portions of them, and also providing a scale 20, for the pointer or hand 21 of the speed indicator.

At one side of the casing is a connection 4 for the flexible shaft (not shown) which serves to transmit power from the moving vehicle, by means of a worm not shown here but illustrated in our said prior application, to a gear wheel 22. This gear wheel 22 is centrally located adjacent to the bottom of the chamber 12 and is adapted by means of its shaft 23, to drive the odometer, while its toothed periphery engages the pinion 24 of a shaft 25 on which shaft the worm wheel 26, is arranged. This worm wheel 26 meshes with a worm 27 stationed parallel to the floor of the chamber in brackets 28, 29, and the worm 27 carries a gear 30, which meshes with a gear 31 on the shaft 32 of the governor. This shaft 32 is mounted in brackets or bearings 33, upon the top of the chamber and is provided near its one end with a balance wheel 34. Sliding upon the said shaft is a collar 35, which a spring 36, coiled upon said shaft, tends to force away from the balance wheel; pivoted arms 37 extend from said collar toward the balance wheel and are weighted at their extremities, links 38 connecting said arms near their weighted ends to the hub of the balance wheel. The spring 36 coiled upon the shaft 32 between the balance wheel 34 and collar 35, then serves to resist outward movement of the arms 37 and insure the usual governing action.

Adjacent to the collar 35, and preferably fast thereto, is a spool 40 which confines between its end flanges the forked arm 39 of a lever 42 fulcrumed as at 43 to swing in horizontal plane. This lever is preferably fulcrumed upon an adjustable bracket 44, as will be hereinafter more particularly described, and its opposite end engages the shaft 45 of the indicating finger to swing the same upon its scale 20. Preferably this engagement is by a curved or cam surface 41 upon the side of the lever, said cam surface being so shaped as to compensate in action upon the said shaft for any inequalities such as would be occasioned by the distance between such engagement and the fulcrum of the lever 42, changing. To further attain such compensation, the eccentric or crank portion 14 of the shaft 45, is in idle position of the indicating finger so directed as to form an acute angle with the line connecting the fulcrum of said shaft with the fulcrum of the lever, and in operation swings across such line to lie on the opposite side thereof, traveling along the cam surface of the lever as it does this. The worm wheel 26, is preferably supported by a bridge 50 whose flanged end 52 is adapted to be screwed to the plate 13, and its opposite or free end lie parallel to said plate, providing a bearing for the shaft of said worm wheel. The bridge 50 has a fixed pin 53 and a second pin 54 adjustable in a circle around the first by means of a slot 55 in the bridge. These pins 54 and 55, are adapted to lie in the slot 56 of a bracket 57, which receives at its opposite bifurcated end, the lever 42 and thus adjustably fulcrum the same. This adjustability enables uniform accuracy to be given the machines in spite of slight variations in the springs of different governors. The shaft 45 of the indicating finger is mounted in a bracket 58, and the indicating finger is normally held at zero by means of a spring 59 extending from the eccentric portion 14 of said shaft 45, to an adjusting screw 60.

In order to secure increased accuracy, we provide our governor with a spiral spring which is tapered or graduated in strength by having its wire flattened into elongated wedge-shape toward its extremity. The flattened faces of said spring are exposed to the lengthwise direction of the same, so as to be visible by decreased diameter of the wire only when looking edgewise thereof, as in the side view of the spring shown in Fig. 14. This increases the sensitiveness of the spring and secures a more accurate indication by the device at a low rate of speed. We furthermore secure increased accuracy by running our governor at double the speed of the flexible shaft.

In order to enable the reading of the speed indicator at any moment to be fixed for subsequent reference, we have provided stop means for locking or clamping the same when desired from the outside of the casing. These means comprise a forked head 63 adapted to engage the shaft 45 of the indicator hand, and having a rod 64 extending therefrom through a bearing block 65. The end of this rod 64 is provided with a ball 66 which slides between the fingers 67 of a slit tube 68, as is common and well known. A finger piece 69 outside the casing is connected by a stem 79 to the said rod 64 or its rounded end, and thus the forked head of the stop can be moved against or away from the shaft of the indicating hand, it being automatically secure in any position by its engagement with the fingers of the slitted tube 68. By means of this device the speed of an automobile, as shown by the indicator, can be preserved for subsequent reference if desired, as for instance in arrests for violating the speed ordinances.

The cap or cover 70, of the casing 2 is usually screwed into place as shown in the drawings, and to more conveniently effect such connection, we make the shaft 71 of the trip-set wheel 72, sectional, as shown in Fig. 8, the inner section terminating within the said cap or cover, and the outer section 74 projecting therethrough and being held in place by a screw 75. To open the casing, therefore, the said outer section of the trip-set shaft is removed and the cap or cover 70 can then be freely turned off.

Having thus described the invention, what we claim as new is:

1. In a speed indicator, the combination of a driven shaft, a governor on said shaft, an indicator shaft having an eccentric portion, an indicator arm on said indicator shaft, a lever fulcrumed intermediate of said governor and indicator shaft eccentric and engaging both said parts, the engagement with the eccentric being by contact at its rear side, and means for locking said indicator shaft against turning.

2. In a speed indicator, the combination of a driven shaft, a governor on said shaft, an indicator shaft having an eccentric portion, an indicator arm on said indicator shaft, a lever fulcrumed intermediate of said governor and indicator shaft eccentric and engaging both said parts, the engagement with the eccentric being by contact at its rear side, and locking means adapted to frictionally engage the main portion of the indicator shaft.

3. In a speed indicator, the combination with a shaft carrying an indicating finger and governor means for turning said shaft, of a longitudinally slidable rod having a head adapted to frictionally engage said shaft, and means for locking said rod in position.

4. In a speed indicator, the combination of an indicator finger, a shaft carrying said finger, governor means adapted to oscillate the said shaft, a head having a V-shaped fork adapted to engage said shaft, and a longitudinally slidable rod connected to said head and provided at its other end with a handle.

5. In a speed indicator, the combination with governor mechanism and movement transmitting means, of a shaft having an eccentric portion adapted to be engaged by said transmitting means and an indicating hand carried by said shaft, a sliding rod having at one end a forked head adapted to engage the said shaft and at the other end outside the indicator casing having a finger piece, and means for holding said sliding rod releasably against sliding.

6. In a speed indicator, the combination with governor mechanism, an indicator shaft having an eccentric portion, a lever fulcrumed intermediate of said governor mechanism and indicator shaft and engaging at one end the former, and a crescent-shaped cam at the other end of said lever engaging the said eccentric portion of the indicator shaft.

7. In a speed indicator, the combination of governing means, an indicator shaft having an eccentric portion, a connecting lever pivoted between said governing means and indicating shaft and adapted to engage said parts at its opposite ends, the eccentric portion of the indicator shaft always projecting toward said governing mechanism and the said lever having a concaved head to engage said eccentric shaft portion laterally.

8. In a speed indicator, the combination with a casing, a removable transverse plate intermediate of the ends of said casing, a cap for the end of said casing, governor mechanism, indicating mechanism and connecting means for said mechanism mounted upon the said interior plate, and bridges or brackets having at one end feet to be secured to said plate and an over-hanging opposite end to provide journal-bearings.

9. In a speed indicator, the combination with governor mechanism, and an indicating hand and shaft, of a connecting lever extending between said governing mechanism and shaft, and a bracket providing a fulcrum for said lever and being adjustably mounted to move longitudinally of itself and to swing laterally.

10. The combination of a plate 13, a bridge mounted upon said plate and having an upper end parallel thereto and provided with a curved slot and a pin at the center of said curvature, a bracket having a slotted arm adapted to receive the said pin and overlap the said curved slot, a screw extending through the two slots, a lever fulcrumed in the said bracket, and governor means and indicating mechanism at the opposite ends of said lever.

11. The combination with a governor shaft, and means for driving the same, of a balance-wheel fixed on said shaft, a sliding collar on the shaft, centrifugal weights connected to said wheel and collar, and a spiral spring arranged on said shaft between the wheel and the collar, said spring having its turns of wire diminishing in thickness or tapering in side view of the spring toward its end, and indicating means connected to said collar.

12. In a governing mechanism, the combination with a shaft, a balance wheel on said shaft, a sliding collar and centrifugal weights connected to said wheel and sliding collar, and a spiral spring between the weight and collar, the strands or turns of which spring are flattened in the direction of the length of the spring and so tapered to the end of the spring.

13. The combination with the casing 2, of the two removable transverse plates dividing the interior of the casing into upper and lower chambers, a screw cover for the opposite end of the lower chamber, odometer mechanism in the upper chamber having a trip-set gear wheel, a sliding shaft for said trip-set wheel projecting into the lower chamber to a point adjacent to the said screw cover thereof, and a removable end section having a finger piece outside the screw cover and a shank engaging the said shaft end, a screw being passed through said outer section longitudinally into the shaft.

14. The combination with the casing 2, of the interior transverse partitions forming a lower chamber, a screw cap or cover for the end of said chamber whereby its interior may be exposed, bridges mounted upon said interior plate and projecting therefrom to provide bearings, and a speed indicator arranged in said chamber with its parts mounted in said bridges, whereby said parts are accessible upon removing the said screw cap or cover.

WILLIAM W. DUDLEY.
LOUIS A. GREENLEAF.
WALLACE R. DUDLEY.

Witnesses to William W. Dudley:
LEWIS A. RAUCH,
J. WILLIS.

Witnesses to Louis A. Greenleaf and Wallace R. Dudley:
EDMUND WHITE,
EMMA L. WHITE.